(12) United States Patent
Montalvo et al.

(10) Patent No.: US 7,302,509 B2
(45) Date of Patent: Nov. 27, 2007

(54) METHOD AND DATA STRUCTURE FOR RANDOM ACCESS VIA A BUS CONNECTION

(75) Inventors: Luis Montalvo, Domloup (FR); Didler Doyen, La Bouexière (FR); Laurent Blondé, Thorigne-Fouillard (FR); Emmanuel Jolly, Rennes (FR)

(73) Assignee: Thomson Licensing, Boulogne-Billancourt (FR)

( * ) Notice: Subject to any disclaimer, the term of this patent is extended or adjusted under 35 U.S.C. 154(b) by 94 days.

(21) Appl. No.: 10/882,071

(22) Filed: Jun. 30, 2004

(65) Prior Publication Data

US 2005/0005049 A1   Jan. 6, 2005

(30) Foreign Application Priority Data

Jul. 3, 2003   (EP)   .................. 03291646

(51) Int. Cl.
*G06F 13/00* (2006.01)
(52) U.S. Cl. .............. 710/110; 710/3; 710/4; 710/9
(58) Field of Classification Search .......... 710/106, 710/8, 306; 711/170, 2; 380/239; 341/50
See application file for complete search history.

(56) References Cited

U.S. PATENT DOCUMENTS

| 5,301,233 A * | 4/1994 | Coutrot et al. ............. 380/239 |
| 5,613,157 A * | 3/1997 | Davidson et al. ............. 710/8 |
| 5,732,404 A * | 3/1998 | Johnson et al. ............. 711/2 |
| 5,897,663 A | 4/1999 | Stancil ............. 711/200 |
| 6,209,074 B1 * | 3/2001 | Dell et al. ............. 711/170 |
| 6,449,289 B1 | 9/2002 | Quicksall ............. 370/475 |
| 7,187,307 B1 * | 3/2007 | Schmidt et al. ............. 341/50 |
| 2004/0221085 A1 * | 11/2004 | Bee et al. ............. 710/306 |

FOREIGN PATENT DOCUMENTS

JP   05204848   *  8/1993

OTHER PUBLICATIONS

Microchip "AnI2Ctm Network Protocal For Environmental Monitoring" XXXXXXXP-002257930 p. 1-5.
Application Message Format IFSF Standard Forecourt Protocal Communication Specification XP-002257931 p. 22-34.
Microchip "AnI2Ctm Network Protocal For Environmental Monitoring" XXXXXXXP-002257930 p. 1-5, unknown date.
Application Message Format IFSF Standard Forecourt Protocal Communication Specification XP-002257931 p. 22-34, unknown date.

* cited by examiner

*Primary Examiner*—Christopher E. Lee
(74) *Attorney, Agent, or Firm*—Joseph J. Laks; Robert D. Shedd; Brian J. Cromarty

(57) ABSTRACT

A method for addressing cells in devices via an I2C bus is suggested, in which the common addressing scheme is supplemented by a 'Data Transfer Mode' byte. The 'Data Transfer Mode' byte specifies the number of the address and data bytes to follow the device addressing and thereby allows for orthogonal and scalable addressing of cells inside a device connected to the bus. The method is fully compatible to the existing I2C standard for writing to the slave device. Setting up and terminating a connection between a master and a slave as well as acknowledging receipt of a byte follows the standard.

3 Claims, 2 Drawing Sheets

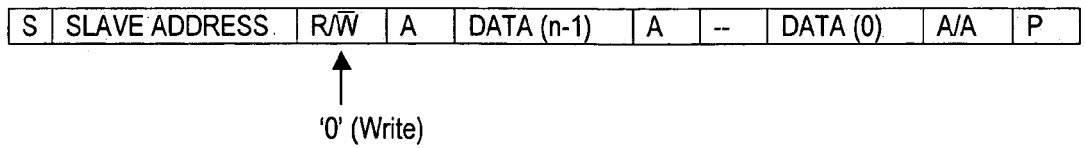
'0' (Write)
☐ From master to slave
☐ From slave to master
Fig. 1    Prior Art
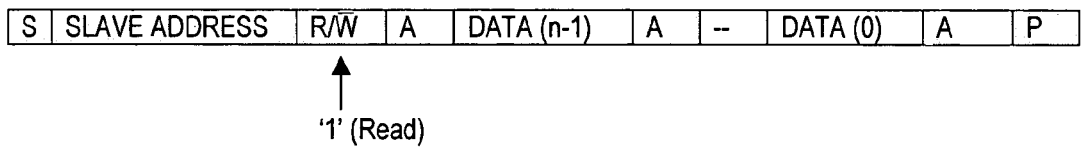
'1' (Read)
☐ From master to slave
☐ From slave to master
Fig. 2    Prior Art
| Bit No. | 7 | 6 | 5 | 4 | 3 | 2 | 1 | 0 |
|---|---|---|---|---|---|---|---|---|
| Description | R2 | R1 | R0 | A2 | A1 | A0 | D1 | D0 |
Fig. 5
| A2 A1 A0 | No. of address bytes | Address space (cells) |
|---|---|---|
| 000 | 1 | 256 |
| 001 | 2 | 64 Ki |
| 010 | 3 | 16 Mi |
| 011 | 4 | 4 Gi |
| 100 | 5 | 1 Ti |
| 101 | 6 | 256 Ti |
| 110 | 7 | 64 Pi |
| 111 | 8 | 16 Ei |
Table 1
| D1 D0 | No. of data bytes | Mode |
|---|---|---|
| 00 | 1 | Byte |
| 01 | 2 | Double Byte |
| 10 | 4 | Word |
| 11 | 8 | Double Word |
Table 2
Fig. 6

METHOD AND DATA STRUCTURE FOR RANDOM ACCESS VIA A BUS CONNECTION

FIELD OF THE INVENTION

A bus connection is a method for interconnecting a number of devices via a number of wires or lines, which at least in part are commonly used by more than one of the devices. Bus connections may be serial or parallel, i.e., information may be sent over a single data line or a number of parallel data lines. Bus connections may include a clock line for determining the rate of information transmitted in a certain time period. Bus connections may also comprise a number of dedicated lines, e.g., for handshake, chip select or the like. A number of standardized bus connections are known, inter alia, the I2C bus, which is a serial bus connection.

BACKGROUND OF THE INVENTION

The I2C bus is a bi-directional 2-wire bus used for inter-IC communication. A master device controls the data transfer with one single slave device out of a maximum of 1024 slave devices at a time. The limitation of the maximum number or slave devices is a consequence of the size of the address field (10 bits) defined by the I2C bus standard. The individual device addresses are stipulated in the I2C bus standard and provide a means to unambiguously identify the devices.

EEPROMs (acronym for: Electric Erasable and Programmable Read Only Memory) are widely used to store programs or data in appliances and devices, where the information stored must be retained even when no power is available. A number of EEPROM devices are readily available which use the I2C bus interface for reading and writing data. Access to the EEPROM content following the I2C bus standard has to be sequential. Some EEPROM manufacturers use proprietary mechanisms that let the master device randomly access up to one memory page (128 bytes) of an EEPROM. However, the size of embedded EEPROM memory, e.g., in ASICs (acronym for: Application Specific Integrated Circuit) and FPGAs (acronym for: Field Programmable Gate Array) has increased significantly and randomly accessing the contents of this memory through the I2C bus is difficult to handle due to the address space limitation stipulated in the standard.

The physical layer of the I2C bus generally consists of two wires interconnecting all devices in a parallel manner. The serial data line (SDA) carries the data to be transmitted in a serial manner, and the serial clock (SCL) provides the clock signals and determines the data rate. Each clock cycle allows for one single bit to be transferred. The START and STOP condition of a connection is established by predetermined logic levels on both lines. A master device is the device which initiates a data transfer on the bus, generates the clock signals for the current connection and terminates the transfer. A slave device is the device addressed by a master. Each device is recognized by a unique address and may operate as either a transmitter or a receiver. A transmitter is the device which sends data to the bus. A receiver is the device which receives data from the bus. In the following description, the logic levels on the I2C bus are referred to as 'high' and 'low' or '1' and '0', respectively. The absolute levels of the I2C bus signals may vary depending on the application. Due to the bi-directional nature of the I2C bus, the input and output ports of the devices must be tri-state ports. Tri-state ports may actively assume high or low levels at a low impedance for transmitting, or represent a high impedance to the bus for receiving data. In standby or unused state, the clock and data lines are pulled to a predetermined level by appropriate biasing means and all devices connected to the bus represent a high impedance to the bus. A START condition is established by a high-to-low transition of the data line (SDA) while the clock line (SCL) remains in a high state. A START condition must always precede any command for data transfer. A STOP condition is established by a low-to-high transition of the data line (SDA) while the clock line (SCL) remains high. A STOP condition terminates the communication between the bus master and the slave. A successful data transfer is indicated by an acknowledge signal (ACK) generated by the receiving device. In order to do so, the transmitting device, either master or slave, depending on the direction of data transfer, releases the SDA line after transmitting 8 bits of data, i.e., the device port assumes a high impedance. During the 9th clock pulse the receiver actively pulls the SDA wire low to acknowledge the receipt of 8 bits of data. Any further error correction is to be implemented separately in the devices and is not part of the I2C bus protocol. The receiving device samples the SDA line on the rising edge of the clock SCL signal. The SDA signal must be stable during the low to high transition of the clock SCL and the data on the SDA line must change only when the SCL line is low. A master device can initiate data transfer with a slave device by establishing a START condition.

In the following the general addressing scheme of an I2C device according to the standard for 7-bit addressing is presented. The 10-bit addressing also available is more complex but essentially similar and will therefore not be referred to in detail. After the START condition is established, the master sends a slave address on the SDA line. The slave address is composed of 8 bits: the 7 most significant make up the slave address, as stipulated in the I2C bus standard, the 8th bit or least significant bit LSB is the read or write bit (R/$\overline{W}$), which is set to '1' for a read operation and to '0' for a write operation. If the slave device identifies a match between the address sent on the SDA line and its own assigned address, it generates an acknowledge signal on the SDA wire during the 9th bit cycle.

The data transfer of a general write operation follows the scheme shown in FIG. 1. In the figure, the transmission from master to slave is indicated by a shaded background, and the transmission from slave to master is indicated by a white background. A master device generates the START condition S, subsequently transmits a slave address with the R/$\overline{W}$ bit set to '0', 'n' bytes of data, and finally generates the STOP condition P. The slave device generates an acknowledge signal A during the 9th clock pulse after each received byte of data.

The data transfer for a general read operation follows the scheme shown in FIG. 2. Again, a master device generates a START condition S. Then the master device transmits the slave address with the R/$\overline{W}$ bit set to '1' and puts its SDA port in high impedance state for receiving. The addressed slave now sends 'n' bytes of data. While the master is transmitter, the slave device generates an acknowledge signal A during the 9th clock pulse after each received byte of data. While the slave is transmitter, the master generates an acknowledge signal A during the 9th clock pulse after each received byte of data. The transfer is terminated when the master generates a STOP condition P.

However, the I2C protocol as stipulated in the standard is limited to sequential read and write operations, and random access is not possible. When addressing a memory, e.g., an EEPROM, the memory needs not only to identify that it was selected, but it also needs information about which memory cell is to be read or written. This may in the current standard be accomplished by a combined read/write operation, wherein during the write operation the EEPROM receives the address to be read and in a subsequent read operation, the memory cell is read. However, this procedure requires the bus master to issue a first START condition, to address the slave for writing, transfer the cell address, then to issue a second START condition, and finally re-address the device for reading. Every single byte has to be addressed individually. This reduces the actual transfer speed of the I2C bus compared to the theoretical value, since some overhead of addressing operations is necessary. If several devices are connected to the bus, bus arbitration may additionally interfere with the need for fast transfer. Arbitration is a procedure to ensure that, if more than one master simultaneously try to control the bus, only one is allowed to do so, thereby ensuring that messages are not corrupted. Some EEPROM manufacturers use a proprietary combination of write and read operations in order to render random access to an EEPROM possible, but these schemes are limited to small address spaces, e.g. 128 bytes.

Application Note AN736 of Microchip Technology Inc. discloses an I2C network protocol which is used for environmental monitoring. The network protocol suggests using a single data length byte, indicating the number of data bytes to be written or read, and a single address offset byte, indicating the slave's memory address to be read or written.

It is, therefore, desirable to provide a method for addressing cells inside a slave device, which allows for true random access.

SUMMARY OF THE INVENTION

The random access scheme according to the invention overcomes the address space limitation of the I2C protocol and enables a master device to randomly access cells in the internal address space of a slave device, e.g., an EEPROM. The inventive method for data transfer for read and write operations in I2C bus architectures uses START and STOP condition, acknowledge bit (ACK) generation, data input protocol, and slave device addressing in the same way as stipulated in the I2C standard. This allows for compatibility of the method's write operation for devices not yet using the inventive method. The inventive read operation, however, is not fully compatible to the standard. The read and write operations known from the prior art are, according to the inventive method, supplemented by a 'Data Transfer Mode' byte, which specifies the number of address bytes to follow for composing the memory cell address, and the number of data bytes associated to the addressed memory cell. The nature of the 'Data Transfer Mode' byte makes the inventive method orthogonal and scalable. Orthogonal access means that read and write operation have a similar structure and length. This may ease the programming of access to the devices. Scalability means that the address space of the memory may vary from a rather small size, e.g., 256 cells when using 1 byte for addressing, to larger numbers of cells, e.g., 16 Ei-cells when using 8 bytes for addressing. 'Ei' (exabinary, read: exbi) is the prefix for binary multiples derived from the SI units for the factor of 2 to power of 60. The scalability advantageously reduces bus traffic to a minimum depending on the address space to be addressed and the amount of data associated to a memory cell, while maintaining maximum flexibility. The inventive method advantageously allows manipulation of single cells in large memories, which is, e.g., often required when only a few parameters from a larger set of parameters have to be changed, or when unique serial numbers need to be part of an otherwise identical memory content of devices.

BRIEF DESCRIPTION OF THE DRAWINGS

In the following, the invention is described in detail with reference to the drawing. In the drawing, FIG. 1 shows the general addressing of an I2C device for write access according to the I2C bus standard;

FIG. 2 shows the general addressing of an I2C device for read access according to the I2C bus standard;

FIG. 5 shows a general representation of a 'Data Transfer Mode' byte; and

FIG. 6 shows an overview of possible address and data length according to the invention;

FIGS. 1 and 2 have been described in the prior art section above and are not referred to again.

In the figures, same or similar elements are designated by the same reference symbols.

DETAILED DESCRIPTION OF PREFERRED EMBODIMENTS

Figure 3:
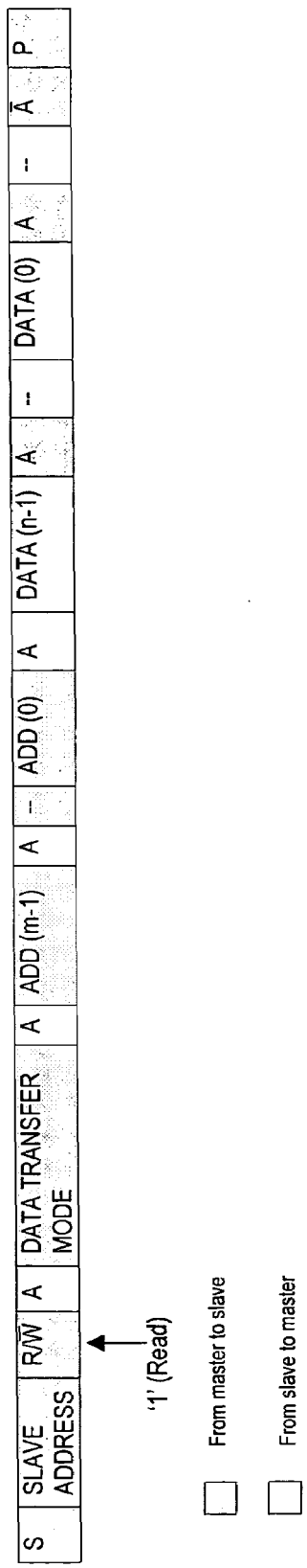
FIG. 3 shows the addressing of an I2C device for a read operation according to the inventive method.

FIG. 3 shows the data transfer scheme for a read operation according to the invention. A master device generates a START condition S and transmits a slave address with the R/$\overline{W}$ bit set to '1'. After this, the master transmits a 'Data Transfer Mode' byte. The 'Data Transfer Mode' byte specifies the number of address bytes (m) that compose a memory cell address, and the number of data bytes (n) that compose the contents of each memory cell. Then, the master device continues the transfer by transmitting the announced number of 'm' address bytes. The slave device replies by sending the requested 'n' data bytes corresponding to that location. The transfer is terminated when the master device generates a STOP condition P. Like in a standard I2C bus connection, the acknowledge signal A is generated by the receiver, either master or slave, during the 9th clock pulse after a byte of data is received.

Figure 4:
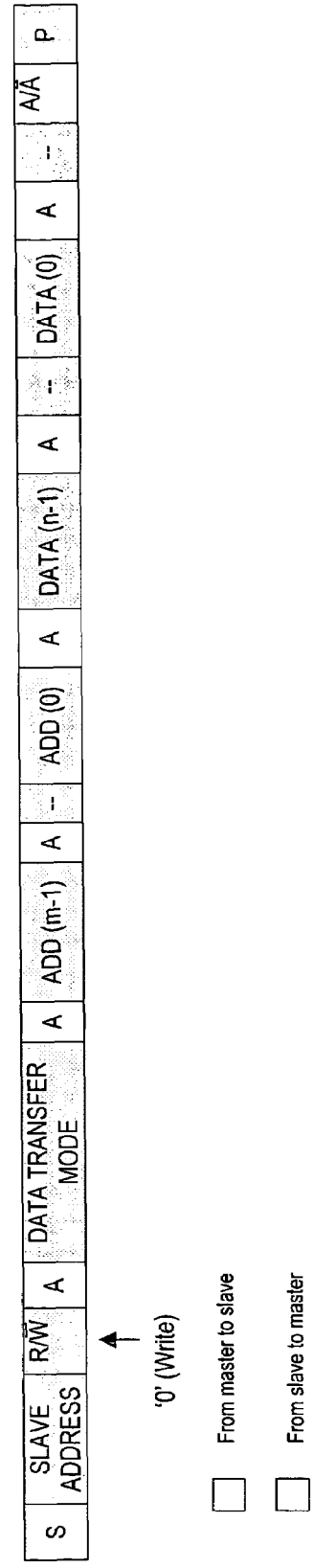
FIG. 4 shows the addressing of an I2C device for a write operation according to the inventive method.

The data transfer scheme for a write operation according to the invention is shown in FIG. 4. The master device generates a START condition S and transmits the slave address with the R/$\overline{W}$ bit set to '0'. After this, the master transmits a 'Data Transfer Mode' byte where it specifies the number of address bytes 'm' that compose a memory cell address, and the number of data bytes 'n' that compose the contents of each memory cell. Then, the master transmits the announced 'm' address bytes specifying the memory location to be written and the 'n' data bytes to be written to the specified memory location. The transfer is terminated when the master generates a STOP condition P. During write operation the acknowledge signal A is sent by the slave during the 9th clock pulse after each byte of data is received, as stipulated in the I2C standard.

It is to be noted that the cycle address—data between the master and the slave may be repeated as many times as required.

FIG. 5 exemplarily shows a 'Data Transfer Mode' byte. The format of the 'Data Transfer Mode' byte is the same for both, read and write operations. Bits 7 through 0 of the 'Data Transfer Mode' byte are defined as follows:

Bits 7-5, designated with the references R2-R0 are reserved for future use.

Bits 4-2, designated with reference A2, A1, A0 indicate the number of address bytes used in the read/write transfer between the master and slave devices. FIG. 6, Table 1, shows the number of address bytes for each A2, A1, A0 setting.

Bits 1-0, designated with reference D1, D0 indicate the number of data bytes to be used in the read/write transfer between the master and slave devices. FIG. 6, Table 2, shows the number of data bytes for each D1, D0 setting.

Although the invention is described with reference to the I2C bus, it is not limited to this type of bus. It is conceivable to use the inventive method for any communication between devices, either uni- or bi-directional, and regardless of the number of interconnecting wires.

What is claimed is:

1. A method for accessing cells in devices connected via a bus connection with a single data line carrying data signals and a single clock line carrying clock signals, wherein the devices connected to the bus are identified by device addresses, wherein a first device establishes a start condition to set up a bus connection, thereby becoming a master for the following communication, wherein the master selects a second device by its device address, the second device becoming a slave for the following communication, wherein the master selects the transmission mode read or write, and wherein the master establishes a stop condition terminating the bus connection after successful communication, the method comprising the master:

transmitting a data mode signal via the single data line after addressing the slave, wherein the data mode signal includes information about the number of cell address bytes for composing the cell address inside the addressed slave device and the number of data bytes to be subsequently transmitted;

transmitting via the single data line a cell address signal according to the data mode signal, wherein the cell address signal includes the bytes which form the cell address; and transmitting data to and/or receiving data from the slave according to the data mode signal.

2. The method of claim 1, wherein writing data and/or reading data from the slave follows the transmission of the data mode signal and the cell address signal.

3. The method of claim 1, wherein each respective receiving device issues an acknowledge signal after a predetermined number of received bits.

* * * * *